US00RE44709E

(19) United States
(12) Reissued Patent
Miyazaki et al.

(10) Patent Number: US RE44,709 E
(45) Date of Reissued Patent: Jan. 21, 2014

(54) SOFT CR-CONTAINING STEEL

(75) Inventors: Atsushi Miyazaki, Chiba (JP); Junichiro Hirasawa, Chiba (JP); Mineo Muraki, Chiba (JP); Yoshihiro Yazawa, Chiba (JP); Osamu Furukimi, Chiba (JP)

(73) Assignee: JFE Steel Corporation, Tokyo (JP)

(21) Appl. No.: 12/465,286

(22) Filed: May 13, 2009

Related U.S. Patent Documents

Reissue of:
(64) Patent No.: 6,740,174
Issued: May 25, 2004
Appl. No.: 09/987,327
Filed: Nov. 14, 2001

(30) Foreign Application Priority Data

Nov. 15, 2000 (JP) ..... 2000-348068

(51) Int. Cl.
*C22C 38/44* (2006.01)
*C22C 38/48* (2006.01)

(52) U.S. Cl.
USPC ..... 148/326; 148/325; 420/69

(58) Field of Classification Search
USPC ..... 148/325, 326; 420/69
See application file for complete search history.

(56) References Cited

U.S. PATENT DOCUMENTS

| | | | | |
|---|---|---|---|---|
| 5,302,214 | A * | 4/1994 | Uematsu et al. | 148/325 |
| 5,496,421 | A * | 3/1996 | Hashizume et al. | 148/326 |
| 6,123,897 | A * | 9/2000 | Fujita et al. | 420/38 |
| 6,521,056 | B2 * | 2/2003 | Muraki et al. | 148/325 |

FOREIGN PATENT DOCUMENTS

| | | |
|---|---|---|
| EP | 0 435 003 A1 | 7/1991 |
| EP | 0 638 653 A1 | 2/1995 |
| EP | 0 930 375 A1 | 7/1999 |
| JP | 07-62498 | 3/1995 |
| JP | 08-3698 | 1/1996 |
| JP | 08-120417 | 5/1996 |
| JP | 10-237600 | 9/1998 |
| JP | 2000-73147 | 3/2000 |

OTHER PUBLICATIONS

Corrected English translation of Tatsuo Kawasaki,"Effects of C, Cr, Si, Ti and Al Contents on Oxidation Resistance of Ferritic Stainless Steels", UDC 669.15'26-194.57:620.193.54, vol. 8, No. 4, Oct. 1976, pp. 437-448.

Tatsuo Kawasaki,"Effects of C, Cr, Si, Ti and Al Contents on Oxidation Resistance of Ferritic Stainless Steels", UDC 669.15'26-194.57:620.193.54, vol. 8, No. 4, Oct. 1976, pp. 437-448, with English translation of article.

* cited by examiner

*Primary Examiner* — Deborah Yee
(74) *Attorney, Agent, or Firm* — Young & Thompson

(57) ABSTRACT

The soft Cr-containing steel includes, on a % by mass basis, C: from about 0.001% to about 0.020%, Si: more than about 0.10% and less than about 0.50%, Mn: less than about 2.00%, P: less than about 0.060%, S: less than about 0.008%, Cr: from about 12.0% to about 16.0%, Ni: from about 0.05% to about 1.00%, N: less than about 0.020%, Nb: from about 10×(C+N) to about 1.00%, Mo: more than about 0.80% and less than about 3.00%, wherein the contents of alloying elements, represented by Si and Mo, respectively, on a % by mass, satisfy the formula Si≤1.2-0.4 Mo, so as to prevent precipitation of the Laves phase and to stably secure an effect of increasing high-temperature strength due to solid solution Mo.

52 Claims, 3 Drawing Sheets

SOFT CR-CONTAINING STEEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a Cr-containing steel. In particular, the present invention relates to a soft Cr-containing steel which has both heat resistance and formability and is suitable for members used in high-temperature environments, for example and especially, exhaust pipes of automobiles and motorcycles, outer casings for catalysts, and exhaust ducts in thermal power plants.

2. Description of the Related Art

Exhaust system members such as exhaust manifolds, exhaust pipes, converter cases, and mufflers, used in exhaust environments of automobiles are required to have superior formability and superior heat resistance. Conventionally in many cases, Cr-containing steel sheets containing Nb and Si, for example, Type 429 (14Cr-0.9Si-0.4Nb-base) steel, which is malleable, and has superior formability at room temperature, and has relatively increased high-temperature strength, have been used for the aforementioned applications. However, when exhaust gas temperatures are increased to about 900° C., which is higher than can be endured due to improvements of engine performance, there is a problem in that Type 429 steel has an insufficient high-temperature proof stress.

In order to solve the aforementioned problems, SUS 444 (JIS (Japanese Industrial Standard) G4305, 19Cr-0.2Nb-1.8Mo) steel, which is a Cr-containing steel having improved high-temperature proof stress by addition of Nb and Mo, has been developed. However, there were problems in that the SUS 444 steel was expensive to produce because of the large amounts of alloying elements required, and in particular, molds were significantly worn during use due to high yield strength YS. Furthermore, although a technique related to a stainless steel having superior intergranular corrosion resistance, superior formability into pipes, and superior high-temperature strength has also been disclosed in Japanese Unexamined Patent Application Publication No. 4-228547, since malleability at room temperature was not taken into consideration, there has been a problem in that molds were significantly worn during use.

Accordingly, requirements for a material having strength equivalent to, or less than, that of Type 429 steel and malleability with excellent workability at room temperature, and having superior high-temperature strength, in order to have a proof stress higher than that of Type 429 steel at 900° C., have become even more intensified. When the high-temperature strength of the material for the exhaust system members is increased, it becomes possible to reduce the thicknesses of the members so as to contribute to reduced weight of automobile bodies. As a consequence, requirements for an increase in high-temperature strength have become even more intensified. Furthermore, accompanying the increase in exhaust gas temperatures, a material for exhaust system members has also been required to have superior oxidation resistance in order to prevent the occurrence of undesired oxidation at high temperatures.

For example, in Japanese Unexamined Patent Application Publication No. 2000-73147, a Cr-containing steel having superior high-temperature strength, workability, and surface properties has been disclosed as a raw material which can be applied to a wide range of temperatures from the high temperature portion to the low temperature portion of the exhaust system member. This raw material is a Cr-containing steel containing C: 0.02% or less, Si: 0.01% or less, Cr: 3.0% to 20%, and Nb: 0.2% to 1.0%, and precipitation of the $Fe_2Nb$ Laves phase is prevented in order to prevent an increase in yield strength at room temperature, and to impart superior high-temperature strength and workability, as well as excellent surface properties.

However, there was a problem in that the steel described in Japanese Unexamined Patent Application Publication No. 2000-73147 could not sufficiently satisfy the properties recently required of the material for exhaust system members, since, for example, undesirable oxidation occurred when the steel was heated to a high temperature in the region of 900° C.

SUMMARY OF THE INVENTION

The present invention was made to solve the aforementioned problems in the conventional techniques and to provide advantages. Accordingly, it is an object of the present invention to provide a soft Cr-containing steel having malleability and superior workability at room temperature, and having, especially, superior high-temperature strength compared to those of conventional steels, as well as superior oxidation resistance. Herein, "malleable at room temperature" means that when the steel is produced under the same conditions as the conventional steels, such as type 429, a strength equivalent to, or less than, those of the conventional steels can be achieved, "superior high-temperature strength" means that a proof stress (0.2% PS) at 900° C. is 17 MPa or more, and "superior oxidation resistance" means that undesired oxidation does not occur at 900° C.

In order to achieve the aforementioned objects, the inventors of the present invention earnestly researched regarding a composition that can significantly improve high-temperature strength without an increase in room-temperature strength of a Cr-containing steel containing Nb. As a result, the inventors of the present invention discovered that regarding the composition, when the Si content was limited to within an appropriate minimum range, the Mo content was appropriately specified in connection with the Si content, and the Cr content was reduced as much as possible, precipitation of the $(Fe,Cr)_2(Mo,Nb)$ Laves phase was prevented and Mo was present primarily in the form of solid solution Mo, and therefore, the Cr-containing steel had malleability at room temperature, and had a significantly improved strength at high temperatures, and the occurrence of undesired oxidation could be prevented.

That is, according to the present invention, a soft Cr-containing steel having a composition composed of, on a % by mass basis, C: from about 0.001% to about 0.020%, Si: more than about 0.10% and less than about 0.50%, Mn: less than about 2.00%, P: less than about 0.060%, S: less than about 0.008%, Cr: from about 12.0% to about 16.0%, Ni: from about 0.05% to about 1.00%, N: less than about 0.020%, Nb: from about 10×(C+N) to about 1.00%, Mo: more than about 0.80% and less than about 3.00%, and Fe and incidental impurities, wherein the contents of alloying elements, silicon and molybdenum, represented by Si and Mo, respectively, on a % by mass basis, satisfy the following formula (1), could be achieved.

$$Si \leq 1.2-0.4Mo. \quad (1)$$

In the present invention, the aforementioned soft Cr-containing steel preferably further contains, on a % by mass basis, at least one selected from the group consisting of Cu: from about 0.05% to about 1.00%, Ti: from about 0.02% to about 0.50%, V: from about 0.05% to about 0.50%, and B: from about 0.0005% to about 0.0100%. The aforementioned soft Cr-containing steels preferably further contain W: from about 0.50% to about 5.00% by mass. The aforementioned soft Cr-containing steels preferably further contain Al: from about 0.02% to about 0.50% by mass. The aforementioned soft Cr-containing steels preferably further contain, on a % by mass basis, at least one selected from the group consisting of REM: from about 0.03% to about 0.10% and Zr: from about 0.05% to about 0.50%.

In the present invention, regarding the state of Mo in the steel, a ratio of (112) diffraction intensity of the Laves phase, $(Fe,Cr)_2(Mo,Nb)$, to (111) diffraction intensity of Nb carbonitride, Nb(C,N), A value=$I\{(Fe,Cr)_2(Mo,Nb)\}_{(112)}/I\{Nb(C,N)\}_{(111)}$, is preferably less than 0.4 based on X-ray diffraction of extraction residues of precipitates in the steel.

DESCRIPTION OF THE PREFERRED EMBODIMENTS

The results of the basic experiments carried out by the inventors of the present invention will now be described.

Figure 1:
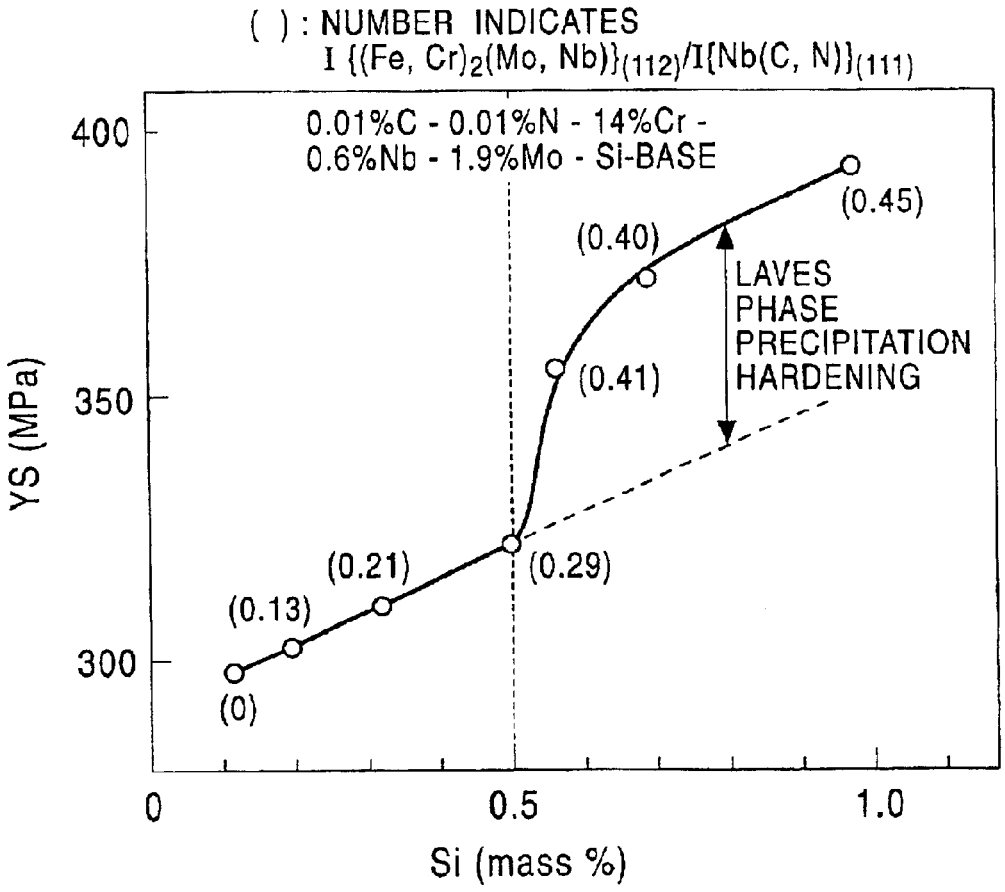
FIG. 1 is a graph showing the relationship between the yield strength YS at room temperature and the Si content.

Regarding cold rolled Cr-containing steel sheets (sheet thickness: 2 mm) having a base composition of 0.01 mass % C, 0.01 mass % N, 0.3 mass % Mn, 14 mass % Cr, 0.6 mass % Nb, and containing Si and Mo at various contents, the yield strength YS at room temperature and the 0.2% proof stress ($\sigma_{0.2at900°C.}$) at 900° C. were measured. FIG. 1 is a graph showing the relationship between the yield strength YS and the Si content at room temperature with respect to 1.9 mass % Mo-base. In the graph, the ratio of (112) diffraction intensity of the Laves phase, $(Fe,Cr)_2(Mo,Nb)$, to (111) the diffraction intensity of the Nb carbonitride, Nb(C,N), A value= $I\{(Fe,Cr)_2(Mo,Nb)\}_{(112)}/I\ \{Nb(C,N)\}_{(111)}$, based on the X-ray diffraction of the extraction residues of precipitates in the steel, is added to each point with a number in parentheses. The methods for measuring the yield strength YS at room temperature, the 0.2% proof stress ($\sigma_{0.2at900°C.}$) at 900° C., and the intensity of X-ray diffraction were similar to those in Example 1 as described below. As is shown in FIG. 1, when the Si content exceeds 0.50% by mass, the YS increases significantly. This is believed to be because when the Si content exceeds 0.50% by mass, as is clear from the increase in A value (number in parentheses in FIG. 1), precipitation of the $(Fe,Cr)_2(Mo,Nb)$ Laves phase increases significantly as a result of the increase in the YS. However, the precipitates immediately become coarse with an increase in temperature and, therefore, do not contribute to the high-temperature strength.

Figure 2:
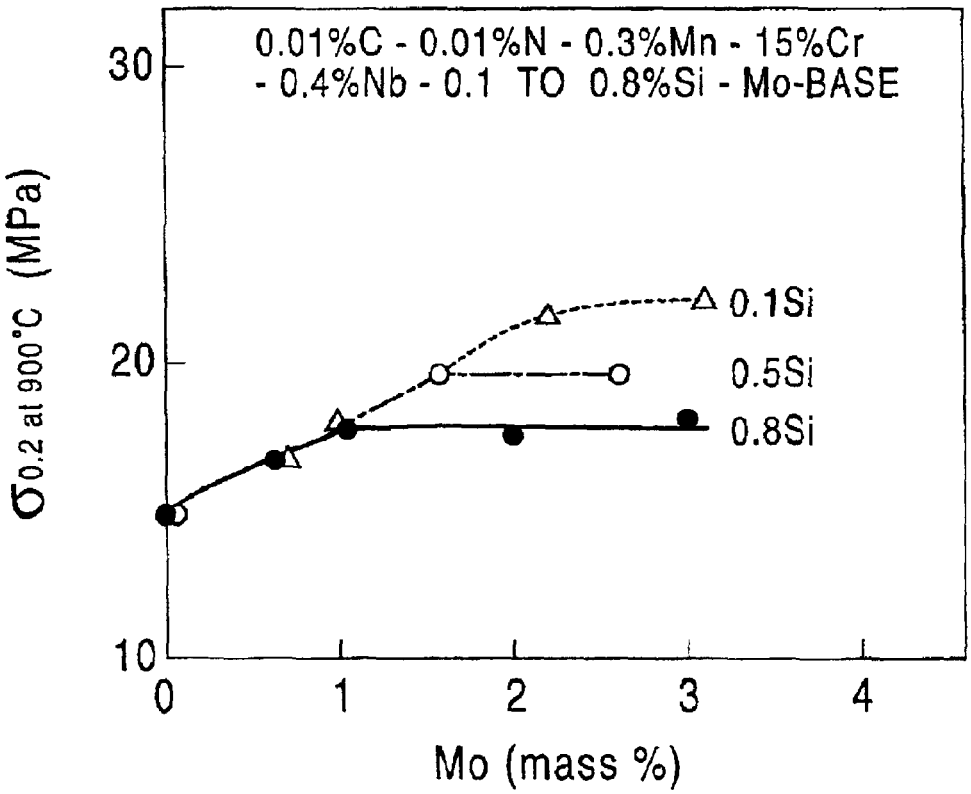
FIG. 2 is a graph showing the relationship between the 0.2% proof stress ($\sigma_{0.2at900°C.}$) at 900° C. and the Mo content.

FIG. 2 is a graph showing the relationship between the 0.2% proof stress ($\sigma_{0.2at900°C.}$) and the Mo content with respect to each of the bases containing Si with contents of 0.10%, 0.50%, and 0.80% by mass. As is shown in FIG. 2, when the Si content is as high as 0.80% by mass, and large amounts of Laves phase have precipitated, the high-temperature strength barely increases with an increase in the Mo content. On the other hand, it is clear that when the Si content is as low as 0.10% by mass or 0.50% by mass, and precipitation of Laves phase has been prevented, the high-temperature strength tends to increase with an increase in the Mo content. That is, it was discovered that in order to increase the high-temperature strength, it was important to prevent precipitation of Mo as the $(Fe,Cr)_2(Mo,Nb)$ Laves phase (precipitates), and to prevent reduction of the amount of solid solution Mo; and at high temperatures, the solid solution of Mo having a greater atomic radius more effectively contributed to increased high-temperature strength than the $(Fe,Cr)_2(Mo,Nb)$ Laves phase.

Next, the inventors of the present invention conducted research regarding the relationship between the Mo content and the Si content with respect to precipitation of the $(Fe,Cr)_2(Mo,Nb)$ Laves phase in a Cr-containing steel containing Nb.

Figure 3:
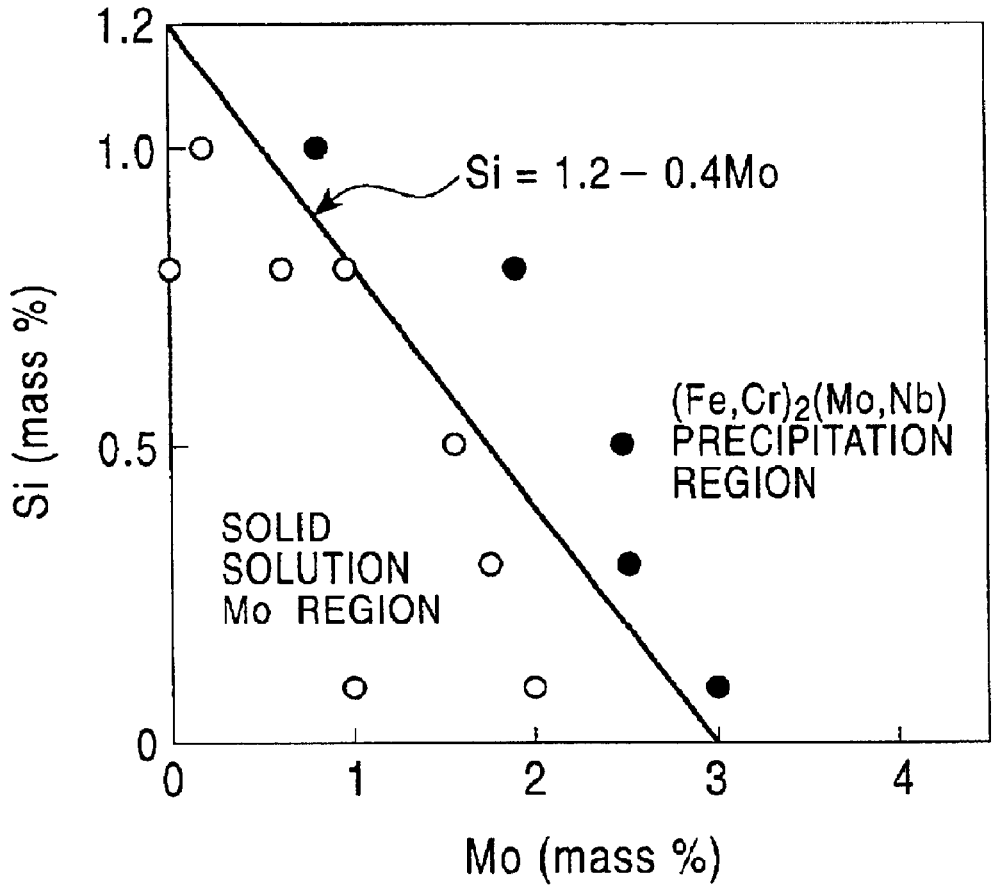
FIG. 3 is a graph showing the relationship between the Si content and the Mo content with respect to precipitation of the $(Fe,Cr)_2(Mo,Nb)$ Laves phase.

FIG. 3 is a graph showing the relationship between the Si content and the Mo content with respect to precipitation of the $(Fe,Cr)_2(Mo,Nb)$ Laves phase. Herein, points where A values are less than 0.4 are indicated by ○, and points where A values are 0.4 or more are indicated by ●.

It is clear that precipitation of the Laves phase is prevented and Mo is present as solid solution Mo in the region where the following formula (1) is satisfied:

$$Si \leq 1.2-0.4Mo \quad (1)$$

(wherein Si and Mo represent the content of respective alloying elements (mass %)).

The inventors of the present invention also discovered that the $(Fe,Cr)_2(Mo,Nb)$ Laves phase is more likely to precipitate with an increase in the Cr content.

As described above, it was discovered that in order to significantly increase the high-temperature strength without an increase in the room-temperature strength of a Cr-containing steel containing Nb, it was important to increase the amount of solid solution Mo by adjusting the composition so as to limit the Si content to within an appropriate minimum range, to appropriately specify the Mo content in connection with the Si content, and to reduce the Cr content as much as possible.

The present invention has been completed with additional research based on the aforementioned findings.

The reasons for the limitations of the composition of the steel according to the present invention will be described. Herein, mass % is briefly referred to as %.

C: from about 0.001% to about 0.020%

C is an element for increasing the strength of steel. However, since when the content is 0.020% or more, degradation of the toughness and formability becomes significant, the content was limited to less than 0.020% in consideration of the importance of formability in the present invention. From the viewpoint of the formability, the lower C content is preferred, and the content is desirably 0.008% or less. In order to achieve the desired strength, the content is preferably 0.001% or more, and more preferably 0.002% to 0.008%.

Si: more than about 0.10% and less than about 0.50%

Si is an element functioning as a deoxidizing agent and improving the oxidation resistance at high temperatures of 900° C. or more and, therefore, is one of the most important elements in the present invention. The aforementioned effects are exhibited when the content is more than 0.10%. On the other hand, when the content is 0.5% or more, hardening from use becomes significant, so that the formability is degraded. Therefore, the Si content was limited to more than 0.10%, but less than 0.50%. The content is preferably more than 0.20%, but 0.45% or less.

Furthermore, Si is an element accelerating the precipitation of the $(Fe,Cr)_2(Mo,Nb)$ Laves phase (Mo Laves phase) so as to increase the room-temperature strength through the precipitation of the Laves phase, and to reduce solid solution Mo with the result that effects of improving high-temperature strength and corrosion resistance due to the solid solution Mo are reduced. Therefore, the Si content must be limited within the range satisfying the relationship between the Si content and the Mo content, Si≤1.2-0.4Mo, as described below.

Mn: less than about 2.00%

Mn functions as a deoxidizing agent. However, when in excess, coarse MnS is formed so as to degrade the formability and the corrosion resistance. Therefore, the Mn content was limited to less than 2.00% in the present invention. The Mn content is preferably 0.60% or less. More preferably, it is 0.20% or less. Further preferably, it is 0.10% or less.

P: less than about 0.060%

P is an element degrading the toughness, so that it is desirable to reduce the content as much as possible. In addition, from the viewpoint of preventing an increase in P treatment cost, the content was limited to less than 0.060%. The content is preferably 0.03% or less.

S: less than about 0.008%

S is an element reducing the elongation and the r value and degrading the formability, as well as degrading the corrosion resistance, which is a basic property of stainless steel and, therefore, it is desirable to reduce the content as much as possible. Furthermore, S is an element accelerating precipitation of the Laves phase so as to harden the steel. Therefore, the S content was limited to less than 0.008% in the present invention. Since excessive reduction causes an increase in production cost, the S content is preferably 0.002% or more. More preferably, it is 0.002% to 0.006%.

Cr: from about 12.0% to about 16.0%

Cr is an element improving the corrosion resistance and oxidation resistance and, therefore, is an important element in the present invention. Furthermore, Cr is an element accelerating the formation of the Laves phase (in the range of the composition of the present invention, $(Fe,Cr)_2(Mo,Nb)$), and when the content is 16.0% or more, precipitation of the Laves phase is accelerated so as to harden the steel. On the other hand, when the content is less than 12.0%, the oxidation resistance and the corrosion resistance are degraded. Accordingly, the Cr content was limited to from about 12.0% to about 16.0%. The Cr content is appropriately chosen within the aforementioned range in accordance with the required levels of oxidation resistance and heat resistance. In particular, in the case where the oxidation resistance is required, the Cr content is preferably from about 14.0% to about 16.0%. More preferably, it is from about 14.0% to about 15.0%.

Ni: from about 0.05% to about 1.00%

Ni is an element improving the toughness, and in order to exhibit this effect, the Ni content must be 0.05% or more. However, since it is expensive, the Ni content was limited to 1.00% or less. The Ni content is preferably from about 0.05% to about 0.80%. More preferably, it is from about 0.50% to about 0.80%.

N: less than about 0.020%

N is an element degrading the toughness and the formability of the steel, and when the N content is 0.020% or more, the degradation of the toughness and the formability become significant. Therefore, the N content was limited to less than 0.020%. Preferably, the N content is reduced as much as possible in the present invention, and it is preferably specified to be 0.010% or less.

Nb: from about 10×(C+N) to about 1.00%

Nb is an element having such functions as fixing C and N, and improving the high-temperature strength, formability, corrosion resistance, and the intergranular corrosion resistance of welded portions, and these effects are exhibited when the Nb content is 10×(C+N) or more. On the other hand, when the content is 1.00% or more, large amounts of the Laves phase precipitate so as to increase the room-temperature strength and degrade the toughness and the surface properties. Therefore, the Nb content was limited to from about 10×(C+N) to about 1.00%. In the case where especially superior high-temperature strength is required, the Nb content is preferably specified to be more than 0.30%. More preferably, it is from about 0.30% to about 0.70%.

Mo: more than about 0.80% and less than about 3.00%

Mo is as important an element as Si, in the present invention. Since Mo is present in the solid solution state, it has functions such as increasing the high-temperature proof stress and improving the corrosion resistance. These effects are exhibited significantly when the Mo content is more than 0.80%. On the other hand, when the content is 3.00% or more, the Laves phase precipitates significantly with the result that the amount of Mo present in the solid solution state is reduced significantly so as to reduce its contribution to the high-temperature proof stress and corrosion resistance, and the high-temperature strength is increased so as to cause hardening. Accordingly, the Mo content was limited to more than 0.80%, but less than 3.00%. The Mo content is preferably more than 1.50%, but less than 3.00%.

In the present invention, in order to prevent the precipitation of the Laves phase as much as possible, and to make full use of the solid solution Mo, the content of Mo must be limited within the range satisfying the relationship between the Si content and the Mo content, Si≤1.2-0.4Mo (Mo≤3-2.5Si), $_{as}$ described below.

The aforementioned chemical components are contained within the aforementioned range, and Si and Mo are contained so as to satisfy the following formula (1):

$$Si \leq 1.2 - 0.4Mo \quad (1)$$

wherein Si and Mo represent the content of respective alloying elements (mass %). When the formula (1) is not satisfied, as shown in FIG. 3, precipitation of the Laves phase becomes significant. As a consequence, the room-temperature strength is increased so as to cause hardening, and the amount of the solid solution Mo is reduced, so that the effect of improving the high-temperature strength due to the solid solution Mo is reduced.

In the present invention, the following components can be further contained in addition to the aforementioned components.

At least one selected from the group consisting of Cu: from about 0.05% to about 1.00%, Ti: from about 0.02% to about 0.50%, V: from about 0.05% to about 0.50%, and B: from about 0.0005% to about 0.0100%

Cu, Ti, V, and B are elements improving the workability and the formability, and at least one of these may be chosen and contained as necessary.

Cu has a function of improving, especially, the formability and corrosion resistance. Such an effect becomes significant when the content is 0.05% or more. However, when Cu is excessively contained at a content exceeding 1.00%, Γ-Cu precipitates so as to become brittle. Therefore, the Cu content is preferably limited to 1.00% or less. More preferably, it is from about 0.05% to about 0.10%.

Ti is an element having a function of improving the formability. Such an effect becomes significant when the content is 0.02% or more. However, when Ti is excessively contained at a content exceeding 0.50%, coarse Ti (C,N) precipitates so as to degrade the surface properties. Therefore, the Ti content is preferably limited to 0.50% or less. More preferably, it is from about 0.02% to about 15(C+N), wherein C represents C content (% by mass) and N represents N content (% by mass).

V is an element having a function of effectively improving the formability. Such an effect becomes remarkable when the content is 0.05% or more. However, when V is excessively contained at a content exceeding 0.50%, coarse V(C,N) precipitates so as to degrade the surface properties. Therefore, the V content is preferably limited to 0.50% or less. More preferably, it is from about 0.05% to about 20(C+N), wherein C represents C content (% by mass) and N represents N content (% by mass).

B is an effective element for improving the workability, especially, workability for secondary processing. Such an effect becomes significant when the content is 0.0005% or more. However, when large amounts of B are contained at a content exceeding 0.0100%, BN is generated so as to significantly degrade the workability. Therefore, the B content is preferably limited to 0.0100% or less. More preferably, it is from about 0.0005% to about 0.0050%.

W: from about 0.50% to about 5.00%

W is an element increasing high-temperature proof stress and improving heat resistance, and may be contained as necessary. Such an effect is exhibited when the content is 0.50% or more. However, when W is excessively contained at a content exceeding 5.00%, the steel is hardened. Therefore, the W content is preferably limited to 5.00% or less. More preferably, it is from about 0.80% to about 3.00%. Further preferably, it is more than 2.00%, but 3.00% or less.

Al: from about 0.02% to about 0.50%

Al functions as a deoxidizing agent, and may be incidentally contained in the case where Al-deoxidation is performed, although it may be intentionally contained as necessary. When Al is intentionally contained, it has functions of forming surface protection scale during welding, preventing permeation of C, N, and O from the atmosphere, and improving the toughness of a welded zone. Such an effect is exhibited significantly when the content is 0.02% or more. On the other hand, when the content exceeds 0.50%, the degradation of the workability becomes significant. Therefore, the Al content is preferably limited to 0.50% or less. More preferably, it is more than 0.03%, but 0.20% or less.

Since REM and Zr improve the oxidation resistance, at least one of them may be chosen and contained as necessary.

REM: from about 0.03% to about 0.10%

REM (rare-earth element) is an element improving the oxidation resistance, and may be contained as necessary in the present invention. Such an effect is exhibited significantly when the content is 0.03% or more. However, when the content exceeds 0.10%, the steel becomes significantly brittle. Therefore, the REM content is preferably limited to 0.10% or less. More preferably, it is from about 0.03% to about 0.08%.

Zr: from about 0.05% to about 0.50%

Since Zr improves the oxidation resistance, it may be contained as necessary. This effect is exhibited when the content is 0.05% or more. However, when the content exceeds 0.50%, the steel becomes brittle due to precipitation of Zr intermetallic compounds. Therefore, the Zr content is preferably limited to from about 0.05% to about 0.50%. More preferably, it is from about 0.10% to about 0.40%.

The state of Mo in the steel: a diffraction intensity ratio based on the X-ray diffraction of the extraction residues of precipitates in the steel, $I\{(Fe,Cr)_2(Mo,Nb)\}_{(112)}/I\{Nb(C,N)\}_{(111)}$), of less than 0.4 is preferable.

Since the steel according to the present invention contains Nb and Mo, the $(Fe,Cr)_2(Mo,Nb)$ Laves phase is likely to precipitate. When the Laves phase precipitates, the yield strength YS is increased significantly at room temperature. However, this Laves phase immediately becomes coarse at a high temperature (900° C.), and does not contribute to the high-temperature strength. Therefore, the $(Fe,Cr)_2(Mo,Nb)$ Laves phase is preferably reduced as much as possible. In the steel according to the present invention, since the Nb content is ten times the C and N content or more, a constant amount of Nb (C,N) precipitates regardless of the amount of Nb. Therefore, it is preferred that the X-ray diffraction intensity from the (112) plane of the $(Fe,Cr)_2(Mo,Nb)$ Laves phase, $I\{(Fe,Cr)_2(Mo,Nb)\})_{(112)}$, relative to the X-ray diffraction intensity from the (111) plane of Nb(C,N), $I\{Nb(C,N)\}_{(111)}$, is reduced, as much as possible, to less than 0.4. Accompanying this, the amount of precipitation of the $(Fe,Cr)_2(Mo,Nb)$ Laves phase is reduced. When this ratio exceeds 0.4, the amount of precipitation of the $(Fe,Cr)_2(Mo,Nb)$ Laves phase is increased, so that the room-temperature strength is increased and the formability is degraded. More preferably, the ratio is less than 0.2.

The method for producing the steel according to the present invention is not specifically limited, and any general method for producing Cr-containing steel can be used. For example, a molten steel having a predetermined composition within the scope of the present invention is refined by a refining method using a smelting furnace, for example, a converter and an electric furnace, or further using ladle refining, vacuum refining, etc., and then, is made into a slab by a continuous casting method or an ingot-making method. Thereafter, a cold rolled annealed sheet is preferably produced by performing the steps of hot rolling, annealing of the hot-rolled sheet, pickling, cold rolling, final annealing, and pickling in that order. The cold rolling may be performed once, or may be performed two or more times with the intermediate annealing. The steps of cold rolling, final annealing, and pickling may be performed repeatedly. Sometimes, the step of annealing the hot-rolled sheet may be omitted. Furthermore, when luster is required, skin pass, etc., may be performed.

EXAMPLES

Example 1

Fifty kilograms of each steel ingot having a composition shown in Table 1 was prepared. The steel ingot was heated to 1,100° C., and thereafter, was hot-rolled so as to produce a hot rolled sheet having a thickness of 5 mm. The resulting hot rolled sheet was subjected to hot rolled sheet annealing (annealing temperature: 1,000° C.), pickling, cold rolling (cold rolling draft: 60%), final annealing (annealing temperature: 1,000° C.), and pickling in that order, so that a cold rolled annealed sheet having a thickness of 2 mm was produced.

Regarding the resulting cold rolled annealed sheet, the high-temperature strength, the formability, and the oxidation resistance were evaluated.

(1) High-temperature strength

Two tensile test pieces of JIS No. 13B, in which the direction of tensile coincided with the direction of the rolling, were taken from each cold rolled annealed sheet, and a high temperature tensile test was performed in conformity with JIS G 0567 under the conditions of tensile temperature: 900° C. and strain rate: 0.3%/min so as to measure the 0.2% proof stress ($\sigma_{0.2at900°C}$) at 900° C. and an average value of the two test pieces was determined. When $\sigma_{0.2at900°C}$ was 17 MPa or more, the high-temperature strength was evaluated to be good (○), and when $\sigma_{0.2at900°\ C.}$ was less than 17 MPa, the high-temperature strength was evaluated to be poor (X).

(2) Formability

Two tensile test pieces of JIS No. 13B were taken from each of three directions of each cold rolled annealed sheet, that is, the direction of the rolling, the direction forming an angle of 45° with the direction of the rolling, and the direction forming an angle of 90° with the direction of the rolling. Then, a room temperature tensile test (test temperature: 20° C.) was performed in conformity with JIS Z 2241. Subsequently, an average value of the two test pieces was determined so as to determine the yield strength YS ($YS_0$, $YS_{45}$, and $YS_{90}$). From the resulting yield strength YS of each direction, an average YS was calculated based on the formula, average YS=$(YS_0+2YS_{45}+YS_{90})/4$, and the formability was evaluated based on the resulting average YS. When the average YS was 320 MPa or less, the formability was evaluated to be good (○), and when the average YS exceeded 320 MPa, the formability was evaluated to be poor (X). The reason the formability was evaluated to be good when the average YS was 320 MPa or less is that, as described above, when the conventional steel, Type 429, is produced under the same conditions as those of the steels according to the present invention, the room-temperature strength is 320 MPa. When the steels used in the Examples of the present invention are subjected to skin pass in order to achieve further luster, the room-temperature strength may increase by about 30 MPa. This steel is also included in the scope of the present invention. Regarding Examples of the present invention, in order to compare with the conventional steel, Type 429, under the same production conditions, the formability was evaluated to be good when the room-temperature strength was 320 MPa or less. Although not described in the Examples, steel having an room-temperature strength exceeding 320 MPa due to the addition of a process, for example, skin pass, in accordance with the requirement for luster is also included in the scope of the present invention.

(3) Oxidation resistance

Two test pieces (2 mm thick×20 mm wide×30 mm long) were taken from each cold rolled annealed sheet, and the test pieces were stood at a test temperature of 900° C. in air for 400 hours. The weights of the test pieces were measured before and after the test, and the amount of change in weight before and after the test was calculated so as to determine the average value of the two test pieces. From the results thereof, when the amount of the change in weight was within ±5 mg/cm$^2$, the oxidation resistance was evaluated to be good (○), and when the amount of the change in weight was more than 5 mg/cm$^2$ or less than −5 mg/cm$^2$, the oxidation resistance was evaluated to be poor (X).

The state of Mo present in each cold rolled annealed sheet was estimated based on the X-ray diffraction of the extraction residue. Each cold rolled annealed sheet was electrolyzed in an acetylacetone-based electrolytic solution so as to produce an extraction residue. Regarding the resulting extraction residue, the X-ray diffraction intensity from the (111) plane of Nb(C,N), $I\{Nb(C,N)\}_{(111)}$, and the X-ray diffraction intensity from the (112) plane of the $(Fe,Cr)_2(Mo,Nb)$ Laves phase, $I\{(Fe,Cr)_2(Mo,Nb)\}_{(112)}$, were determined based on the X-ray diffraction, and subsequently, $I\{(Fe,Cr)_2(Mo,Nb)\}_{(112)}/I\{Nb(C,N)\}_{(111)}$ was calculated.

The results thereof are shown in Table 2.

Each of the steels of the Examples of the present invention has a yield strength YS of 320 MPa or less at room temperature so as to have low room-temperature strength, and to have malleability equivalent to, or more than, that of Type 429 steel (Steel No. 16) as a conventional example. Furthermore, each of the steels of the Examples of the present invention has a high $\sigma_{0.2at900°\ C.}$ of 17 MPa or more so as to have a high-temperature strength superior to those of Type 429 steel (Steel No. 16) and SUS436L steel (JIS G4305, Steel No. 15), as conventional examples. In addition, no undesired oxidations are observed even at 900° C., so that the steels according to the present invention have superior oxidation resistance. On the other hand, the steels of the comparative examples and the conventional examples, which are outside the scope of the present invention, have a yield strength YS exceeding 320 MPa at room temperature so as to have hardness, have a $\sigma_{0.2at900°}$ c. less than 17 MPa so as to have reduced high-temperature strength, or have degraded oxidation resistance.

As described above, according to the present invention, a Cr-containing steel suitable for an exhaust system member of an automobile, which exploits the full effect of Mo, has malleability and superior formability at room temperature, has high proof stress and superior heat resistance at high temperatures, and has oxidation resistance at high temperatures, can be produced inexpensively, so that the present invention exhibits significant industrial effects. The steel according to the present invention is also suitable for exhaust path members of thermal-power generation systems which are required to have properties similar to those described above. Furthermore, since the steel according to the present invention contains Mo having an effect of improving corrosion resistance, it can also be applied to uses in which corrosion resistance is required. That is, it can be preferably used for, for example, materials for fuel systems, such as gasoline tanks and fuel supply pipes, materials for mauls, and kitchen appliances, as well as materials for separators of fuel cells and, therefore, the steel according to the present invention has very great industrial significance.

TABLE 1

| Steel No. | Chemical component (mass %) | | | | | | | | | | | |
|---|---|---|---|---|---|---|---|---|---|---|---|---|
| | C | Si | Mn | P | S | Cr | Ni | N | Nb | Mo | 10 (C + N) | Si ≤ 1.2-0.4 Mo |
| 1 | 0.005 | 0.33 | 0.45 | 0.028 | 0.003 | 14.8 | 0.15 | 0.005 | 0.41 | 1.71 | 0.10 | ○ |
| 2 | 0.005 | 0.48 | 0.08 | 0.020 | 0.003 | 14.9 | 0.2 | 0.005 | 0.40 | 2.12 | 0.10 | ○ |
| 3 | 0.008 | 0.25 | 0.25 | 0.023 | 0.002 | 13.4 | 0.55 | 0.009 | 0.35 | 1.83 | 0.17 | ○ |
| 4 | 0.005 | 0.13 | 0.08 | 0.018 | 0.004 | 12.1 | 0.25 | 0.008 | 0.35 | 1.63 | 0.13 | ○ |
| 5 | 0.009 | 0.38 | 0.07 | 0.019 | 0.005 | 14.2 | 0.65 | 0.009 | 0.38 | 1.31 | 0.18 | ○ |
| 6 | 0.004 | 0.21 | 0.45 | 0.033 | 0.003 | 15.5 | 0.61 | 0.004 | 0.34 | 1.81 | 0.08 | ○ |
| 7 | 0.012 | 0.49 | 0.25 | 0.022 | 0.007 | 14.6 | 0.91 | 0.014 | 0.55 | 1.92 | 0.26 | ○ |
| 8 | 0.011 | 0.14 | 0.10 | 0.031 | 0.005 | 14.9 | 0.25 | 0.008 | 0.31 | 1.61 | 0.19 | ○ |
| 9 | 0.009 | 0.13 | 0.04 | 0.024 | 0.005 | 14.9 | 0.61 | 0.008 | 0.38 | 1.71 | 0.17 | ○ |
| 10 | 0.008 | 0.11 | 0.09 | 0.018 | 0.003 | 14.9 | 0.35 | 0.008 | 0.37 | 1.61 | 0.16 | ○ |

TABLE 1-continued

| | | | | | | | | | | | | |
|---|---|---|---|---|---|---|---|---|---|---|---|---|
| 11 | 0.009 | 0.49 | 0.48 | 0.018 | 0.003 | 15.7 | 0.24 | 0.005 | 0.44 | 0.92 | 0.14 | ○ |
| 12 | 0.008 | 0.14 | 0.08 | 0.023 | 0.003 | 14.8 | 0.45 | 0.008 | 0.38 | 2.11 | 0.16 | ○ |
| 13 | 0.007 | 0.95 | 0.08 | 0.022 | 0.006 | 20.4 | 0.08 | 0.007 | 0.54 | 2.03 | 0.14 | x |
| 14 | 0.002 | 0.35 | 0.11 | 0.024 | 0.004 | 19.5 | 0.12 | 0.003 | 0.55 | 1.61 | 0.05 | ○ |
| 15 | 0.008 | 0.55 | 0.45 | 0.033 | 0.004 | 18.5 | 0.22 | 0.008 | — | 0.92 | 0.16 | x |
| 16 | 0.004 | 0.98 | 0.45 | 0.028 | 0.003 | 14.9 | 0.15 | 0.004 | 0.49 | — | 0.08 | ○ |
| 17 | 0.008 | 0.48 | 0.15 | 0.033 | 0.003 | 15.4 | 0.22 | 0.009 | 0.38 | 2.01 | 0.17 | x |
| 18 | 0.012 | 0.04 | 0.15 | 0.020 | 0.003 | 14.8 | 0.25 | 0.009 | 0.35 | 0.92 | 0.21 | ○ |
| 19 | 0.007 | 0.11 | 0.25 | 0.033 | 0.003 | 14.9 | 0.15 | 0.005 | 0.44 | 3.11 | 0.12 | x |
| 20 | 0.005 | 0.33 | 0.41 | 0.031 | 0.010 | 14.8 | 0.23 | 0.007 | 0.41 | 1.61 | 0.12 | ○ |
| 21 | 0.005 | 0.31 | 0.41 | 0.031 | 0.003 | 14.5 | 0.31 | 0.005 | 1.12 | 1.72 | 0.10 | ○ |
| 22 | 0.004 | 0.21 | 0.41 | 0.025 | 0.003 | 12.6 | 0.03 | 0.003 | 0.31 | 1.51 | 0.07 | ○ |
| 23 | 0.006 | 0.15 | 0.05 | 0.015 | 0.004 | 13.1 | 0.03 | 0.004 | 0.35 | 1.61 | 0.10 | ○ |
| 24 | 0.004 | 0.35 | 0.95 | 0.021 | 0.003 | 14.9 | 0.25 | 0.007 | 0.41 | 1.55 | 0.11 | ○ |
| 25 | 0.004 | 0.33 | 1.78 | 0.021 | 0.002 | 12.7 | 0.55 | 0.005 | 0.49 | 1.61 | 0.09 | ○ |

| Steel | Chemical component (mass %) | | | | | | | | |
|---|---|---|---|---|---|---|---|---|---|
| No. | Cu | Ti | V | B | W | Al | REM | | Remarks |
| 1 | — | — | — | — | — | — | — | | Example of present invention |
| 2 | — | — | — | — | — | — | — | | Example of present invention |
| 3 | — | — | — | — | — | — | — | | Example of present invention |
| 4 | 0.08 | — | — | — | — | — | — | | Example of present invention |
| 5 | — | — | — | — | 0.81 | — | — | | Example of present invention |
| 6 | — | 0.08 | — | — | — | — | — | | Example of present invention |
| 7 | — | — | 0.12 | — | — | — | — | | Example of present invention |
| 8 | — | — | — | — | 0.02 | — | | | Example of present invention |
| 9 | 0.09 | — | — | 0.0009 | — | — | — | | Example of present invention |
| 10 | — | — | 0.09 | 0.0005 | — | — | 0.05 | | Example of present invention |
| 11 | 0.14 | — | — | — | — | — | — | | Example of present invention |
| 12 | — | — | — | 0.0025 | — | 0.03 | 0.06 | | Example of present invention |
| 13 | — | — | — | — | — | — | — | SUS444 | Conventional example |
| 14 | 0.25 | — | — | — | — | — | — | SUS444 | Conventional example |
| 15 | — | 0.35 | — | — | — | — | — | SUS436L | Conventional example |
| 16 | — | — | — | — | — | — | | Type429 | Conventional example |
| 17 | 0.15 | — | — | — | — | — | — | | Conventional example |
| 18 | — | — | — | — | — | — | — | | Conventional example |
| 19 | — | — | — | — | — | — | — | | Conventional example |
| 20 | — | — | — | — | — | — | — | | Conventional example |
| 21 | — | — | — | — | — | — | — | | Conventional example |
| 22 | — | — | — | — | 2.51 | — | — | | Example of present invention |
| 23 | — | — | — | — | 2.11 | — | — | Zr: 0.28 | Example of present invention |
| 24 | 0.13 | — | — | — | — | — | — | | Example of present invention |
| 25 | — | — | — | — | 2.59 | — | — | | Example of present invention |

TABLE 2

| | | Ordinary temperature strength | | High-temperature strength | | Oxidation | |
|---|---|---|---|---|---|---|---|
| Steel No. | $\frac{\{(Fe,CR)_2(Mo,Nb)_{112}\}}{\{Nb(C, N)\}_{111}}$ | YS MPa | Evaluation | $\sigma_{0.2}$ at 900° C. | Evaluation | resistance Evaluation | Remarks |
| 1 | 0.21 | 300 | ○ | 18 | ○ | ○ | Example of present invention |
| 2 | 0.29 | 320 | ○ | 20 | ○ | ○ | Example of present invention |
| 3 | 0.08 | 290 | ○ | 20 | ○ | ○ | Example of present invention |
| 4 | 0.00 | 280 | ○ | 19 | ○ | ○ | Example of present invention |
| 5 | 0.18 | 300 | ○ | 20 | ○ | ○ | Example of present invention |
| 6 | 0.18 | 290 | ○ | 20 | ○ | ○ | Example of present invention |
| 7 | 0.27 | 310 | ○ | 20 | ○ | ○ | Example of present invention |
| 8 | 0.00 | 290 | ○ | 19 | ○ | ○ | Example of present invention |
| 9 | 0.00 | 290 | ○ | 20 | ○ | ○ | Example of present invention |
| 10 | 0.00 | 280 | ○ | 19 | ○ | ○ | Example of present invention |
| 11 | 0.24 | 310 | ○ | 17 | ○ | ○ | Example of present invention |
| 12 | 0.22 | 310 | ○ | 22 | ○ | ○ | Example of present invention |
| 13 | 0.71 | 390 | x | 18 | ○ | ○ | Conventional example |
| 14 | 0.61 | 350 | x | 18 | ○ | ○ | Conventional example |
| 15 | 0.00 | 300 | ○ | 15 | x | ○ | Conventional example |
| 16 | 0.33 | 320 | ○ | 15 | x | ○ | Conventional example |
| 17 | 0.51 | 350 | x | 18 | ○ | ○ | Comparative example |
| 18 | 0.00 | 270 | ○ | 17 | ○ | x | Comparative example |
| 19 | 0.45 | 390 | x | 22 | ○ | ○ | Comparative example |
| 20 | 0.45 | 341 | x | 18 | ○ | ○ | Comparative example |
| 21 | 0.81 | 390 | x | 22 | ○ | ○ | Comparative example |
| 22 | 0.12 | 320 | ○ | 25 | ○ | ○ | Example of present invention |
| 23 | 0.05 | 310 | ○ | 24 | ○ | ○ | Example of present invention |

TABLE 2-continued

| Steel No. | $\frac{\{(Fe,CR)_2(Mo,Nb)_{112}\}}{\{Nb(C,N)\}_{111}}$ | Ordinary temperature strength YS MPa | Evaluation | High-temperature strength $\sigma_{0.2}$ at 900° C. | Evaluation | Oxidation resistance Evaluation | Remarks |
|---|---|---|---|---|---|---|---|
| 24 | 0.00 | 305 | ○ | 19 | ○ | ○ | Example of present invention |
| 25 | 0.35 | 320 | ○ | 25 | ○ | ○ | Example of present invention |

What is claimed is:

[1. A soft Cr-containing steel having a composition, on a % by mass basis, comprising:

C: from about 0.001% to about 0.020%;

Si: more than about 0.10% and less than about 0.50%;

Mn: less than about 2.00%;

P: less than about 0.060%;

S: less than about 0.008%;

Cr: from about 12.0% or more to about 16.0%;

Ni: from about 0.05% to about 1.00%;

N: less than about 0.020%;

Nb: from about 0.30% to less than 1.00%;

Mo: more than about 0.80% and less than about 3.00%; and

Fe and incidental impurities, wherein the contents of alloying elements, silicon and molybdenum, represented by Si and Mo, respectively, on a % by mass basis, satisfy the following formula (1)

$$Si \leq 1.2-0.4Mo \quad (1) \text{ and,}$$

regarding the state of Mo in the steel, a ratio of (112) diffraction intensity of the Laves phase, $(Fe,Cr)_2(Mo,Nb)$, to (111) diffraction intensity of Nb carbonitride, Nb(C,N), A value $=I\{(Fe,Cr)_2(Mo,Nb)\}_{(112)}/I\{Nb(C,N)\}_{(111)}$, is less than 0.4 based on X-ray diffraction of extraction residues of precipitates in the steel.]

[2. The soft Cr-containing steel according to claim 1, wherein the content of Mo is more than about 1.50% and less than about 3.00% by mass in the composition.]

[3. The soft Cr-containing steel according to claim 1, further comprising, on a % by mass basis, at least one selected from the group consisting of Cu: from about 0.05% to about 1.00%, Ti: from about 0.02% to about 0.50%, V: from about 0.05% to about 0.50%, and B: from about 0.0005% to about 0.0100%.]

[4. The soft Cr-containing steel according to claim 2, further comprising, on a % by mass basis, at least one selected from the group consisting of Cu: from about 0.05% to about 1.00%, Ti: from about 0.02% to about 0.50%, V: from about 0.05% to about 0.50%, and B: from about 0.0005% to about 0.0100%.]

[5. The soft Cr-containing steel according to claim 1, further comprising W: from about 0.50% to about 5.00% by mass.]

[6. The soft Cr-containing steel according to claim 2, further comprising W: from about 0.50% to about 5.00% by mass.]

[7. The soft Cr-containing steel according to claim 3, further comprising W: from about 0.50% to about 5.00% by mass.]

[8. The soft Cr-containing steel according to claim 1, further comprising Al: from about 0.02% to about 0.50% by mass.]

[9. The soft Cr-containing steel according to claim 2, further comprising Al: from about 0.02% to about 0.50% by mass.]

[10. The soft Cr-containing steel according to claim 3, further comprising Al: from about 0.02% to about 0.50% by mass.]

[11. The soft Cr-containing steel according to claim 4, further comprising Al: from about 0.02% to about 0.50% by mass.]

[12. The soft Cr-containing steel according to claim 1, further comprising, on a % by mass basis, at least one element selected from the group consisting of REM: from about 0.03% to about 0.10% and Zr: from about 0.05% to about 0.50%.]

[13. The soft Cr-containing steel according to claim 2, further comprising, on a % by mass basis, at least one element selected from the group consisting of REM; from about 0.03% to about 0.10% and Zr: from about 0.05% to about 0.50%.]

[14. The soft Cr-containing steel according to claim 3, further comprising, on a % by mass basis, at least one element selected from the group consisting of REM: from about 0.03% to about 0.10% and Zr: from about 0.05% to about 0.50%.]

[15. The soft Cr-containing steel according to claim 4, further comprising, on a % by mass basis, at least one element selected from the group consisting of REM: from about 0.03% to about 0.10% and Zr: from about 0.05% to about 0.50%.]

[16. The soft Cr-containing steel according to claim 5, further comprising, on a % by mass basis, at least one element selected from the group consisting of REM: from about 0.03% to about 0.10% and Zr: from about 0.05% to about 0.50%.]

[17. The soft Cr-containing steel according to claim 1, wherein the % by mass basis of Nb is from about 0.30% to about 0.70%.]

[18. A soft ferrite structure, Cr-containing steel having a composition, on a % by mass basis, comprising:

C: from about 0.001% to about 0.020%;

Si: more than about 0.10% and less than about 0.50%;

Mn: less than about 2.00%;

P: less than about 0.060%;

S: less than about 0.008%;

Cr: from about 12.0% or more to about 16.0%;

Ni: from about 0.05% to about 1.00%;

N: less than about 0.020%;

Nb: from about 0.30% to less than 1.00%;

Mo: more than about 0.80% and less than about 3.00%; and

Fe and incidental impurities, wherein the contents of alloying elements, silicon and molybdenum, represented by Si and Mo, respectively, on a % by mass basis, satisfy the following formula (1)

$$Si \leq 1.2-0.4Mo \quad (1)$$

wherein the steel has a ferrite single phase structure and the state of Mo in the steel, a ratio of (112) diffraction intensity of the Laves phase, (Fe,Cr)2(Mo,Nb), to (111) diffraction intensity of Nb carbonitride, Nb(C,N), A value $=I\{(Fe,Cr)_2(Mb,Nb)\}_{(112)}/I\{Nb(C,N)\}_{(111)}$, is less than 0.4 based on X-ray diffraction of extraction residues of precipitates in the steel.]

[19. The ferrite structure, soft Cr-containing steel according to claim 18, wherein the % by mass basis of Nb is from about 0.30% to about 0.70%.]

[20. An automobile exhaust system component, comprising a member made of a soft Cr-containing steel having a composition, on a % by mass basis, comprising:

C: from about 0.001% to about 0.020%;

Si: more than about 0.10% and less than about 0.50%;

Mn: less than about 2.00%;

P: less than about 0.060%;

S: less than about 0.008%;

Cr: from about 12.0% or more to about 16.0%;

Ni: from about 0.05% to about 1.00%;

N: less than about 0.020%;

Nb: from about 0.30% to less than 1.00%;

Mo: more than about 0.80% and less than about 3.00%; and

Fe and incidental impurities, wherein the contents of alloying elements, silicon and molybdenum, represented by Si and Mo, respectively, on a % by mass basis, satisfy the following formula (1)

$$Si \leq 1.2-0.4Mo \quad (1), \text{ and}$$

regarding the state of Mo in the steel, a ratio of (112) diffraction intensity of the Laves phase, $(Fe,Cr)_2(Mo,Nb)$, to (111) diffraction intensity of Nb carbonitride, Nb(C,N), A value $=I\{(Fe,Cr)_2(Mo,Nb)\}_{(112)}/I\{Nb(C,Nn)\}_{(111)}$, is less than 0.4 based on X-ray diffraction of extraction residues of precipitates in the steel.]

[21. The automobile exhaust system component of claim 20, wherein the component is an outer casing for a catalytic converter.]

[22. The automobile exhaust system component of claim 20, wherein the component is an exhaust pipe.]

[23. The soft Cr-containing steel according to claim 18, wherein the content of Mo is more than about 1.50% and less than about 3.00% by mass in the composition.]

[24. The soft Cr-containing steel according to claim 18, further comprising, on a % by mass basis, at least one selected from the group consisting of Cu: from about 0.05% to about 1.00%, Ti: from about 0.02% to about 0.50%, V: from about 0.05% to about 0.50%, and B: from about 0.0005% to about 0.0100%.]

[25. The soft Cr-containing steel according to claim 23, further comprising, on a % by mass basis, at least one selected from the group consisting of Cu: from about 0.05% to about 1.00%, Ti: from about 0.02% to about 0.50%, V: from about 0.05% to about 0.50%, and B: from about 0.0005% to about 0.0100%.]

[26. The soft Cr-containing steel according to claim 18, further comprising W: from about 0.50% to about 5.00% by mass.]

[27. The soft Cr-containing steel according to claim 23, further comprising W: from about 0.50% to about 5.00% by mass.]

[28. The soft Cr-containing steel according to claim 24, further comprising W: from about 0.50% to about 5.00% by mass.]

[29. The soft Cr-containing steel according to claim 18, further comprising Al: from about 0.02% to about 0.50% by mass.]

[30. The soft Cr-containing steel according to claim 23, further comprising Al: from about 0.02% to about 0.50% by mass.]

[31. The soft Cr-containing steel according to claim 24, further comprising Al: from about 0.02% to about 0.50% by mass.]

[32. The soft Cr-containing steel according to claim 25, further comprising Al: from about 0.02% to about 0.50% by mass.]

[33. The soft Cr-containing steel according to claim 18, further comprising, on a % by mass basis, at least one element selected from the group consisting of REM: from about 0.03% to about 0.10% and Zr: from about 0.05% to about 0.50%.]

[34. The soft Cr-containing steel according to claim 23, further comprising, on a % by mass basis, at least one element selected from the group consisting of REM: from about 0.03% to about 0.10% and Zr: from about 0.05% to about 0.50%.]

[35. The soft Cr-containing steel according to claim 24, further comprising, on a % by mass basis, at least one element selected from the group consisting of REM: from about 0.03% to about 0.10% and Zr: from about 0.05% to about 0.50%.]

[36. The soft Cr-containing steel according to claim 25, further comprising, on a % by mass basis, at least one element selected from the group consisting of REM: from about 0.03% to about 0.10% and Zr: from about 0.05% to about 0.50%.]

[37. The soft Cr-containing steel according to claim 26, further comprising, on a % by mass basis, at least one element selected from the group consisting of REM: from about 0.03% to about 0.10% and Zr: from about 0.05% to about 0.50%.]

[38. The exhaust system according to claim 20, wherein the content of Mo is more than about 1.50% and less than about 3.00% by mass in the composition.]

[39. The exhaust system according to claim 20, further comprising, on a % by mass basis, at least one selected from the group consisting of Cu: from about 0.05% to about 1.00%, Ti: from about 0.02% to about 0.50%, V: from about 0.05% to about 0.50%, and B!from about 0.0005% to about 0.0100%.]

[40. The exhaust system according to claim 38, further comprising, on a % by mass basis, at least one selected from the group consisting of Cu: from about 0.05% to about 1.00%, Ti: from about 0.02% to about 0.50%, V: from about 0.05% to about 0.50%, and B: from about 0.0005% to about 0.0100%.]

[41. The exhaust system according to claim 20, further comprising W: from about 0.50% to about 5.00% by mass.]

[42. The exhaust system according to claim 38, further comprising W: from about 0.50% to about 5.00% by mass.]

[43. The exhaust system according to claim 39, further comprising W: from about 0.50% to about 5.00% by mass.]

[44. The exhaust system according to claim 20, further comprising Al: from about 0.02% to about 0.50% by mass.]

[45. The exhaust system according to claim 38, further comprising Al: from about 0.02% to about 0.50% by mass.]

[46. The exhaust system according to claim 39, further comprising Al: from about 0.02% to about 0.50% by mass.]

[47. The exhaust system according to claim 40, further comprising Al: from about 0.02% to about 0.50% by mass.]

[48. The exhaust system according of claim 20, further comprising, on a % by mass basis, at least one element selected from the group consisting of REM: from about 0.03% to about 0.10% and Zr: from about 0.05% to about 0.50%.]

[49. The exhaust system according to claim 38, further comprising, on a % by mass basis, at least one element selected from the group consisting of REM: from about 0.03% to about 0.10% and Zr: from about 0.05% to about 0.50%.]

[50. The exhaust system according to claim 39, further comprising, on a % by mass basis, at least one element selected from the group consisting of REM: from about 0.03% to about 0.10% and Zr: from about 0.05% to about 0.50%.]

[51. The exhaust system according to claim 40, further comprising, on a % by mass basis, at least one element selected from the group consisting of REM: from about 0.03% to about 0.10% and Zr: from about 0.05% to about 0.50%.]

[52. The exhaust system according to claim 41, further comprising, on a % by mass basis, at least one element selected from the group consisting of REM: from about 0.03% to about 0.10% and Zr: from about 0.05% to about 0.50%.]

*53. A soft Cr-containing steel having a composition, on a % by mass basis, comprising:*

*C: from 0.001% to 0.020%;*

*Si: 0.25% or more and less than 0.50%;*

*Mn: less than 2.00%;*

*P: less than 0.060%;*

*S: from 0.002% to 0.006%;*

*Cr: from 14.0% to 16.0%;*

*Ni: from 0.05% to 1.00%;*

*N: less than 0.020%;*

*Nb: from 0.30% to less than 1.00%;*

*Mo: more than 0.80% and less than 3.00%; and*

*a balance of Fe and incidental impurities,*

*wherein the contents of alloying elements, silicon and molybdenum, represented by Si and Mo, respectively, on a % by mass basis, satisfy the following formula (1)*

$$Si \leq 1.2-0.4Mo \quad (1) \text{ and,}$$

*regarding the state of Mo in the steel, a ratio of (112) diffraction intensity of the Laves phase, $(Fe,Cr)_2(Mo,Nb)$, to (111) diffraction intensity of Nb carbonitride, Nb(C,N), A value $=I\{(Fe,Cr)_2(Mo,Nb)\}_{(112)}/I\{Nb(C,N)\}_{(111)}$, is less than 0.4 based on X-ray diffraction of extraction residues of precipitates in the steel,*

*wherein Ti is not added to the composition as an alloying element.*

*54. A soft ferrite structure, Cr-containing steel having a composition, on a % by mass basis, comprising:*

*C: from 0.001% to 0.020%;*

*Si: 0.25% or more and less than 0.50%;*

*Mn: less than 2.00%;*

*P: less than 0.060%;*

*S: from 0.002% to 0.006%;*

*Cr: from 14.0% to 16.0%;*

*Ni: from 0.05% to 1.00%;*

*N: less than 0.020%;*

*Nb: from 0.30% to less than 1.00%;*

*Mo: more than 0.80% and less than 3.00%; and*

*a balance of Fe and incidental impurities,*

*wherein the contents of alloying elements, silicon and molybdenum, represented by Si and Mo, respectively, on a % by mass basis, satisfy the following formula (1)*

$$Si \leq 1.2-0.4Mo \quad (1)$$

*wherein the steel has a ferrite single phase structure and the state of Mo in the steel, a ratio of (112) diffraction intensity of the Laves phase, (Fe,Cr)2(Mo,Nb), to (111) diffraction intensity of Nb carbonitride, Nb(C,N), A value $=I\{(Fe,Cr)_2(Mo,Nb)\}_{(112)}/I\{Nb(C,N)\}_{(111)}$, is less than 0.4 based on X-ray diffraction of extraction residues of precipitates in the steel,*

*wherein Ti is not added to the composition as an alloying element.*

*55. An automobile exhaust system component, comprising a member made of a soft Cr-containing steel having a composition, on a % by mass basis, comprising:*

*C: from 0.001% to 0.020%;*

*Si: 0.25% or more and less than 0.50%;*

*Mn: less than 2.00%;*

*P: less than 0.060%;*

*S: from 0.002% to 0.006%;*

*Cr: from 14.0% to 16.0%;*

*Ni: from 0.05% to 1.00%;*

*N: less than 0.020%;*

*Nb: from 0.30% to less than 1.00%;*

*Mo: more than 0.80% and less than 3.00%; and*

*a balance of Fe and incidental impurities,*

*wherein the contents of alloying elements, silicon and molybdenum, represented by Si and Mo, respectively, on a % by mass basis, satisfy the following formula (1)*

$$Si \leq 1.2-0.4Mo \quad (1) \text{ and,}$$

*regarding the state of Mo in the steel, a ratio of (112) diffraction intensity of the Laves phase, $(Fe,Cr)_2(Mo,Nb)$, to (111) diffraction intensity of Nb carbonitride, Nb(C,N), A value $=I\{(Fe,Cr)_2(Mo,Nb)\}_{(112)}/I\{Nb(C,Nn)\}_{(111)}$, is less than 0.4 based on X-ray diffraction of extraction residues of precipitates in the steel,*

*wherein Ti is not added to the composition as an alloying element.*

*56. The soft Cr-containing steel according to claim 53, wherein the content of Mo is more than 1.50% and less than 3.00% by mass in the composition.*

*57. The soft Cr-containing steel according to claim 53, further comprising, on a % by mass basis, at least one selected from the group consisting of Cu: from 0.05% to 1.00%, V: from 0.05% to 0.50%, and B: from 0.0005% to 0.0100%.*

*58. The soft Cr-containing steel according to claim 56, further comprising, on a % by mass basis, at least one selected from the group consisting of Cu: from 0.05% to 1.00%, V: from 0.05% to 0.50%, and B: from 0.0005% to 0.0100%.*

*59. The soft Cr-containing steel according to claim 53, further comprising W: from 0.50% to 5.00% by mass.*

*60. The soft Cr-containing steel according to claim 56, further comprising W: from 0.50% to 5.00% by mass.*

*61. The soft Cr-containing steel according to claim 57, further comprising W: from 0.50% to 5.00% by mass.*

*62. The soft Cr-containing steel according to claim 53, further comprising Al: from 0.02% to 0.50% by mass.*

*63. The soft Cr-containing steel according to claim 56, further comprising Al: from 0.02% to 0.50% by mass.*

*64. The soft Cr-containing steel according to claim 57, further comprising Al: from 0.02% to 0.50% by mass.*

*65. The soft Cr-containing steel according to claim 58, further comprising Al: from 0.02% to 0.50% by mass.*

*66. The soft Cr-containing steel according to claim 53, further comprising, on a % by mass basis, at least one element selected from the group consisting of REM: from 0.03% to 0.10% and Zr: from 0.05% to 0.50%.*

*67. The soft Cr-containing steel according to claim 56, further comprising, on a % by mass basis, at least one element selected from the group consisting of REM; from 0.03% to 0.10% and Zr: from 0.05% to 0.50%.*

*68. The soft Cr-containing steel according to claim 57, further comprising, on a % by mass basis, at least one element selected from the group consisting of REM: from 0.03% to 0.10% and Zr: from 0.05% to 0.50%.*

*69. The soft Cr-containing steel according to claim 58, further comprising, on a % by mass basis, at least one element selected from the group consisting of REM: from 0.03% to 0.10% and Zr: from 0.05% to 0.50%.*

*70. The soft Cr-containing steel according to claim 59, further comprising, on a % by mass basis, at least one element selected from the group consisting of REM: from 0.03% to 0.10% and Zr: from 0.05% to 0.50%.*

*71. The soft Cr-containing steel according to claim 53, wherein the % by mass basis of Nb is from 0.30% to 0.70%.*

*72. The ferrite structure, soft Cr-containing steel according to claim 54, wherein the % by mass basis of Nb is from 0.30% to 0.70%.*

*73. The soft Cr-containing steel according to claim 54, wherein the content of Mo is more than 1.50% and less than 3.00% by mass in the composition.*

*74. The soft Cr-containing steel according to claim 54, further comprising, on a % by mass basis, at least one selected from the group consisting of Cu: from 0.05% to 1.00%, V: from 0.05% to 0.50%, and B: from 0.0005% to 0.0100%.*

*75. The soft Cr-containing steel according to claim 73, further comprising, on a % by mass basis, at least one selected from the group consisting of Cu: from 0.05% to 1.00%, V: from 0.05% to 0.50%, and B: from 0.0005% to 0.0100%.*

*76. The soft Cr-containing steel according to claim 54, further comprising W: from 0.50% to 5.00% by mass.*

*77. The soft Cr-containing steel according to claim 73, further comprising W: from 0.50% to 5.00% by mass.*

*78. The soft Cr-containing steel according to claim 74, further comprising W: from 0.50% to 5.00% by mass.*

*79. The soft Cr-containing steel according to claim 54, further comprising Al: from 0.02% to 0.50% by mass.*

*80. The soft Cr-containing steel according to claim 73, further comprising Al: from 0.02% to 0.50% by mass.*

*81. The soft Cr-containing steel according to claim 74, further comprising Al: from 0.02% to 0.50% by mass.*

*82. The soft Cr-containing steel according to claim 75, further comprising Al: from 0.02% to 0.50% by mass.*

*83. The soft Cr-containing steel according to claim 54, further comprising, on a % by mass basis, at least one element selected from the group consisting of REM: from 0.03% to 0.10% and Zr: from 0.05% to 0.50%.*

*84. The soft Cr-containing steel according to claim 73, further comprising, on a % by mass basis, at least one element selected from the group consisting of REM: from 0.03% to 0.10% and Zr: from 0.05% to 0.50%.*

*85. The soft Cr-containing steel according to claim 74, further comprising, on a % by mass basis, at least one element selected from the group consisting of REM: from 0.03% to 0.10% and Zr: from 0.05% to 0.50%.*

*86. The soft Cr-containing steel according to claim 75, further comprising, on a % by mass basis, at least one element selected from the group consisting of REM: from 0.03% to 0.10% and Zr: from 0.05% to 0.50%.*

*87. The soft Cr-containing steel according to claim 76, further comprising, on a % by mass basis, at least one element selected from the group consisting of REM: from 0.03% to 0.10% and Zr: from 0.05% to 0.50%.*

*88. The automobile exhaust system component of claim 55, wherein the component is an outer casing for a catalytic converter.*

*89. The automobile exhaust system component of claim 55, wherein the component is an exhaust pipe.*

*90. The exhaust system according to claim 55, wherein the content of Mo is more than 1.50% and less than 3.00% by mass in the composition.*

*91. The exhaust system according to claim 55, further comprising, on a % by mass basis, at least one selected from the group consisting of Cu: from 0.05% to 1.00%, V: from 0.05% to 0.50%, and B:from 0.0005% to 0.0100%.*

*92. The exhaust system according to claim 90, further comprising, on a % by mass basis, at least one selected from the group consisting of Cu: from 0.05% to 1.00%, Ti: from 0.02% to 0.50%, V: from 0.05% to 0.50%, and B: from 0.0005% to 0.0100%.*

*93. The exhaust system according to claim 55, further comprising W: from 0.50% to 5.00% by mass.*

*94. The exhaust system according to claim 90, further comprising W: from 0.50% to 5.00% by mass.*

*95. The exhaust system according to claim 91, further comprising W: from 0.50% to 5.00% by mass.*

*96. The exhaust system according to claim 55, further comprising Al: from 0.02% to 0.50% by mass.*

*97. The exhaust system according to claim 90, further comprising Al: from 0.02% to 0.50% by mass.*

*98. The exhaust system according to claim 91, further comprising Al: from 0.02% to 0.50% by mass.*

*99. The exhaust system according to claim 92, further comprising Al: from 0.02% to 0.50% by mass.*

*100. The exhaust system according of claim 55, further comprising, on a % by mass basis, at least one element selected from the group consisting of REM: from 0.03% to 0.10% and Zr: from 0.05% to 0.50%.*

*101. The exhaust system according to claim 90, further comprising, on a % by mass basis, at least one element selected from the group consisting of REM: from 0.03% to 0.10% and Zr: from 0.05% to 0.50%.*

*102. The exhaust system according to claim 91, further comprising, on a % by mass basis, at least one element selected from the group consisting of REM: from 0.03% to 0.10% and Zr: from 0.05% to 0.50%.*

*103. The exhaust system according to claim 92, further comprising, on a % by mass basis, at least one element selected from the group consisting of REM: from 0.03% to 0.10% and Zr: from 0.05% to 0.50%.*

*104. The exhaust system according to claim 93, further comprising, on a % by mass basis, at least one element selected from the group consisting of REM: from 0.03% to 0.10% and Zr: from 0.05% to 0.50%.*

* * * * *